INVENTOR.
CEDRIC MARSH
BY Robert S. Dunham
ATTORNEY

Sept. 26, 1967  C. MARSH  3,343,315
GUYED Y TOWER
Original Filed Jan. 11, 1965  6 Sheets-Sheet 3
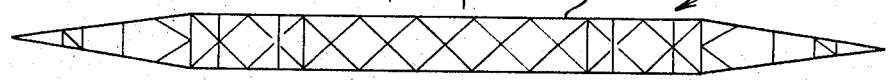
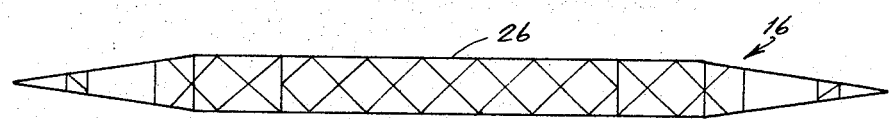
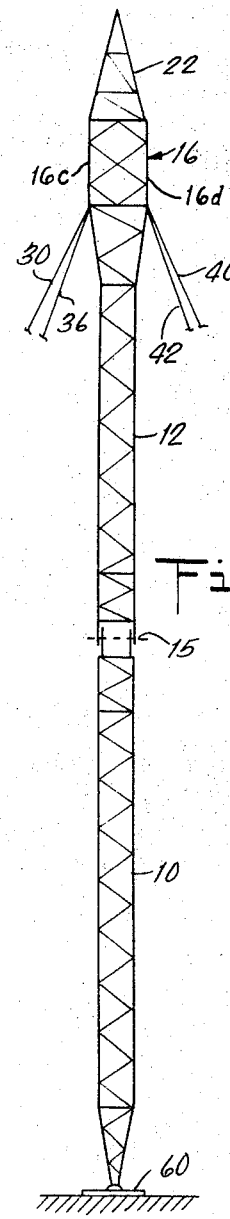
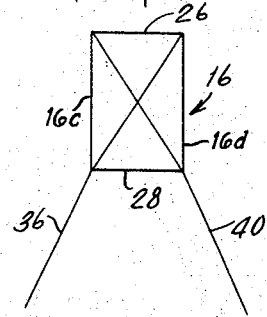
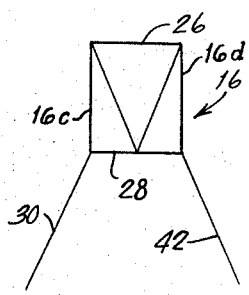
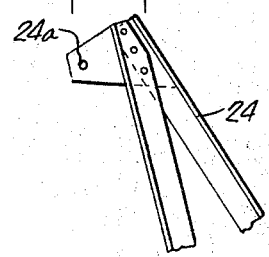
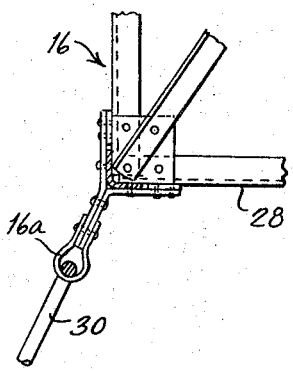
INVENTOR.
CEDRIC MARSH
BY
Robert S. Dunham
ATTORNEY Sept. 26, 1967 C. MARSH 3,343,315
GUYED Y TOWER
Original Filed Jan. 11, 1965 6 Sheets-Sheet 4
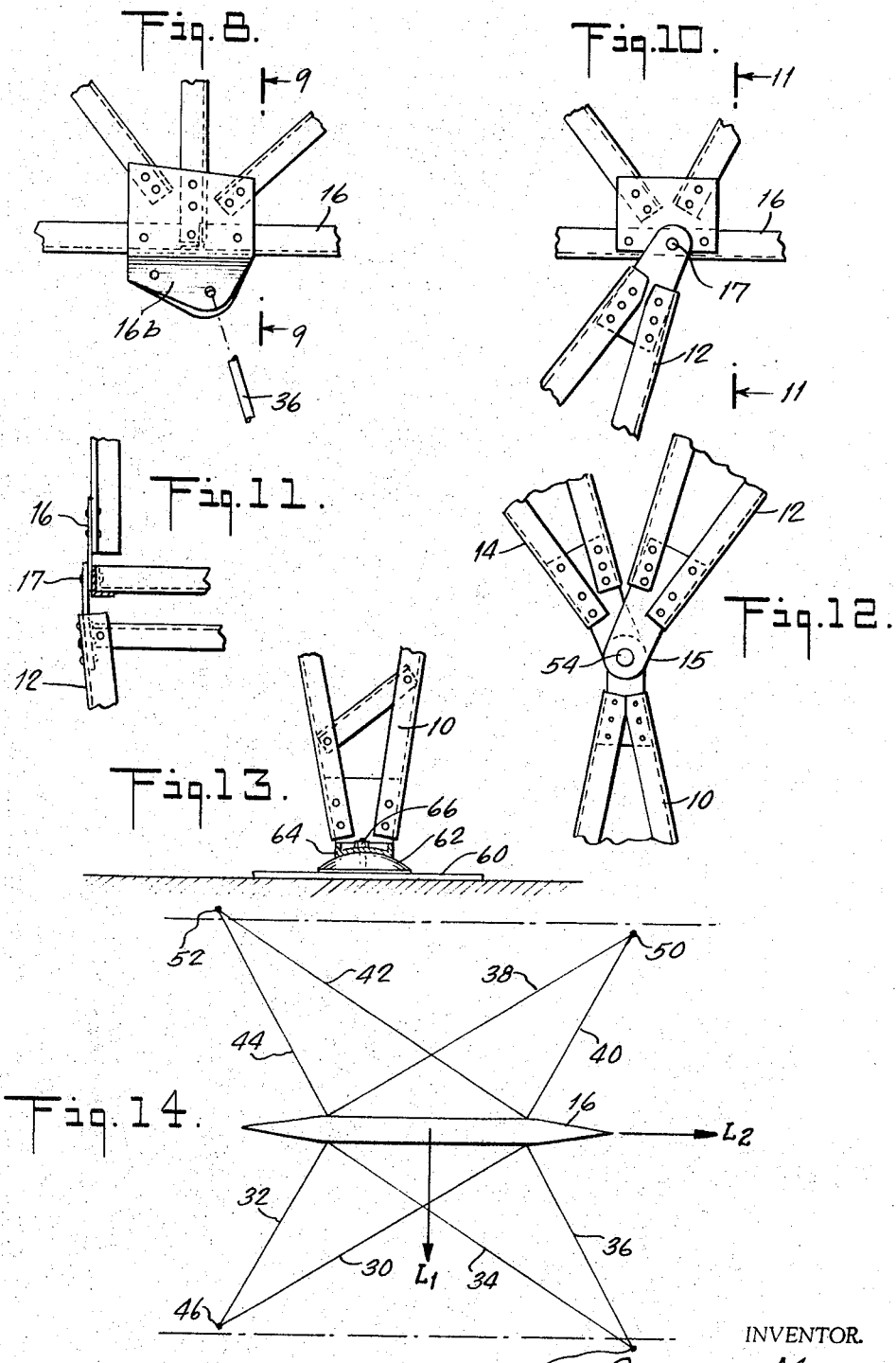
INVENTOR.
CEDRIC MARSH
BY
Robert S. Dunham
ATTORNEY Sept. 26, 1967   C. MARSH   3,343,315
GUYED Y TOWER
Original Filed Jan. 11, 1965   6 Sheets-Sheet 5

INVENTOR.
CEDRIC MARSH
BY
Robert S. Dunham
ATTORNEY

Sept. 26, 1967  C. MARSH  3,343,315
GUYED Y TOWER
Original Filed Jan. 11, 1965  6 Sheets-Sheet 6

INVENTOR.
CEDRIC MARSH
BY Robert S. Dunham
ATTORNEY

UnitedStates Patent Office 3,343,315
Patented Sept. 26, 1967

3,343,315
GUYED Y TOWER
Cedric Marsh, Hudson Heights, Quebec, Canada, assignor to Aluminium Laboratories Limited, Montreal, Quebec, Canada, a corporation of Canada
Continuation of application Ser. No. 427,535, Jan. 11, 1965. This application Dec. 9, 1966, Ser. No. 611,504
Claims priority, application Great Britain, Aug. 4, 1964, 31,495/64
22 Claims. (Cl. 52—148)

This application is a continuation of my copending application Ser. No. 427,535 filed Jan. 11, 1965, for Guyed Tower Arrangements, now abandoned. The application Ser. No. 427,535 is in turn a continuation-in-part of my application Ser. No. 301,079 filed Aug. 9, 1963, for Guyed Towers (now abandoned).

This invention relates to guyed towers for power transmission lines.

It is the primary object of this invention to provide a transmission tower of Y configuration which is so constructed and arranged that the resulting structural system is stable, statically determinate, with no source of secondary moments, and which shows an appreciable economy of materials over previous systems.

Guyed transmission towers are usually of V or portal configuration and embody four guy wires. This arrangement, however, under transverse loads, utilizes only one leg of the tower to full advantage, as only one pair pair of guys is brought into action, and in high towers suffers from excessive bending in the long legs due to wind forces.

A tower of Y configuration having a rigid body which is guyed by four guy wires in a conventional manner in an effort to combine the legs is subject to such heavy bending moments at the junction of the Y as to nullify any advantage otherwise gained from the use of this particular form of tower.

This invention is based on the concept that the full advantages of a Y-tower can be realized if the tower is supported by the novel multiple guying system herein described and illustrated. The invention involves in a tower of Y configuration in which the arms of the Y are articulated to the leg of the Y. Further, the invention also involves a guyed Y-tower in which the articulated arms are bridged by an entirely rigid cross-beam member, and the articulated attachment of arms to leg constitutes the sole attachment of the cross-beam assembly (arms and cross-beam) to the leg.

The utility and advantages of the invention as compared with transmission towers now in common use can be appreciated from a consideration of the following.

A four-guy V-tower is practical, economically attractive, and structurally sound. It is simple, statically determinate, free from secondary effects and it is easily analyzed. Guy loads in an unloaded tower of this type are self-equalizing and, although a free standing tower will fall if any one guy is released, a tower with conductors and ground wires attached is stable with one guy removed even at changes in transmission line direction.

This tower is, however, structurally less efficient than desirable because transverse loads are carried entirely by one pair of guys and one tower leg, since the guys associated with the other leg go slack leaving that leg unstressed by transverse loads. Nevertheless, the unstressed leg, because of reversibility of loading in all but angle towers (towers at changes in transmission line direction), must be of equal strength. Moreover, in high towers the legs become long, slender, beam columns and the scantlings required are demanded as much by lateral moments as by axial load.

To overcome these objections in a V-tower, eight guy wires between the cross-beam of the tower and earth anchorages can be used instead of the four which are conventionally used. This device the resistance to lateral loads between two systems, each composed of one tower leg and its associated guys, and reduces the axial load in one leg by an amount equal to that carried by the other leg. The distribution of the load between the two systems for such loads is, however, indeterminate and may be dependent upon the pretensioning of the guys in the two systems. Hence if one set of guys is maladjusted, the majority of the load can be thrown into the other system, thereby destroying the effectiveness of the two systems. For longitudinal loads, the distribution of load is also indeterminate since two guy systems are available to carry the load. Hence all guys must be designed to carry maximum loads as if only one system rather than two were available.

The substitution of a Y-tower for one of V configuration does not necessarily reduce the lateral unsupported leg length, for should such a tower be supported by four guy wires, the leg still spans the full tower height under lateral wind loads with the result that a high moment is created in the leg. Additionally, each upwardly extending arm of the Y must be designed for full axial load from the guy as in a four-guy V-tower, and the resulting tower is usually heavier than the four-guy V-tower.

By adding an extra set of four guy wires to the cross-beam of the Y-tower such that a system of eight guy wires is employed, transverse loading is distributed between two guy wire systems in a determinate manner so that each system takes one half of the transverse load regardless of pretensioning of the guys in the system, guy loads (but not anchorage loads) are halved for transverse loading, and guy loads and anchorage loads are almost halved from broken wire loading. Individual guy loads on the cross-beam are halved because the number of guys is doubled. Since the stress of each guy on the cross-beam is halved, the cross-beam may be reduced in size accordingly, even though the total guying load on the beam is the same, which permits a marked saving in cross-beam weight. Failure of one guy, even on a free standing tower, will leave the tower intact, and two guys or a complete anchorage may fail without tower collapse when the transmission line is strung. There are no secondary stresses under any loading system in which the arms of the Y-tower are articulated to the legs.

An eight-guy Y-tower as described above with the guys all attached to the cross-beam of the tower may be statically indeterminate for longitudinal loads, inasmuch as such loads may be supported by each of two systems of guys. Hence the distribution of a longitudinal load between the two systems may be dependent upon the pretensioning of the guys in the systems, and the majority of the load can be assumed by one of the systems alone. The indeterminacy of this eight-guy Y-tower arrangement may be eliminated if six of the guys are attached to the cross-beam of the tower while the remaining two guys are attached to the junction of the upwardly extending arms of the tower and the vertical leg of the tower. In such an arrangement one system of four guys supports lateral loads, while the remaining system of four guys supports longitudinal loads. Each system is statically determinate, and hence guying loads may be accurately computed with guying capacities being dictated by loading requirements in the field. Pretensioning of guys, therefore, has no effect on the assumption of either lateral or longitudinal loads by the individual guys of each system.

Further features and advantages of the invention will become clear as the detailed description thereof is read in light of the accompanying drawings. In the drawings, like reference numerals indicate like parts, in the several figures, and:

FIG. 2 is a side elevational view of the transmission tower of FIG. 1;

FIG. 3 is a diagrammatic view of the bottom chord of the cross-beam, taken on line 3—3 of FIG. 1;

FIG. 4 is a diagrammatic view of the top chord of the cross-beam, taken on line 4—4 of FIG. 1;

FIG. 5 is a diagrammatic view representing a cross section of the cross-beam on line 5—5 of FIG. 1;

FIG. 6 is a diagrammatic cross-sectional view of the cross-beam, taken on line 6—6 of FIG. 1;

FIG. 7 is a fragmentary, detail view showing the end of one of the cross-beam trusses at the end of which is provided a ground wire support;

FIG. 8 is a fragmentary, detail view showing a guy wire connector carried at one face of the cross-beam;

FIG. 9 is a fragmentary, detail view on line 9—9 of FIG. 8;

FIG. 10 is a fragmentary, detail view showing the connection between one of the upwardly extending arms of the Y-tower and the cross-beam;

FIG. 11 is a fragmentary, detail view on line 11—11 of FIG. 10;

FIG. 12 is a fragmentary, detail view showing the junction between the upper end of the tower leg and the upwardly extending and diverging arms of the Y;

FIG. 13 is a fragmentary, detail view of the lower end of the tower leg shown in association with a footing structure;

FIG. 14 is a diagrammatic plan view showing the guy wire anchors in non-rectangular relation;

Figure 1:
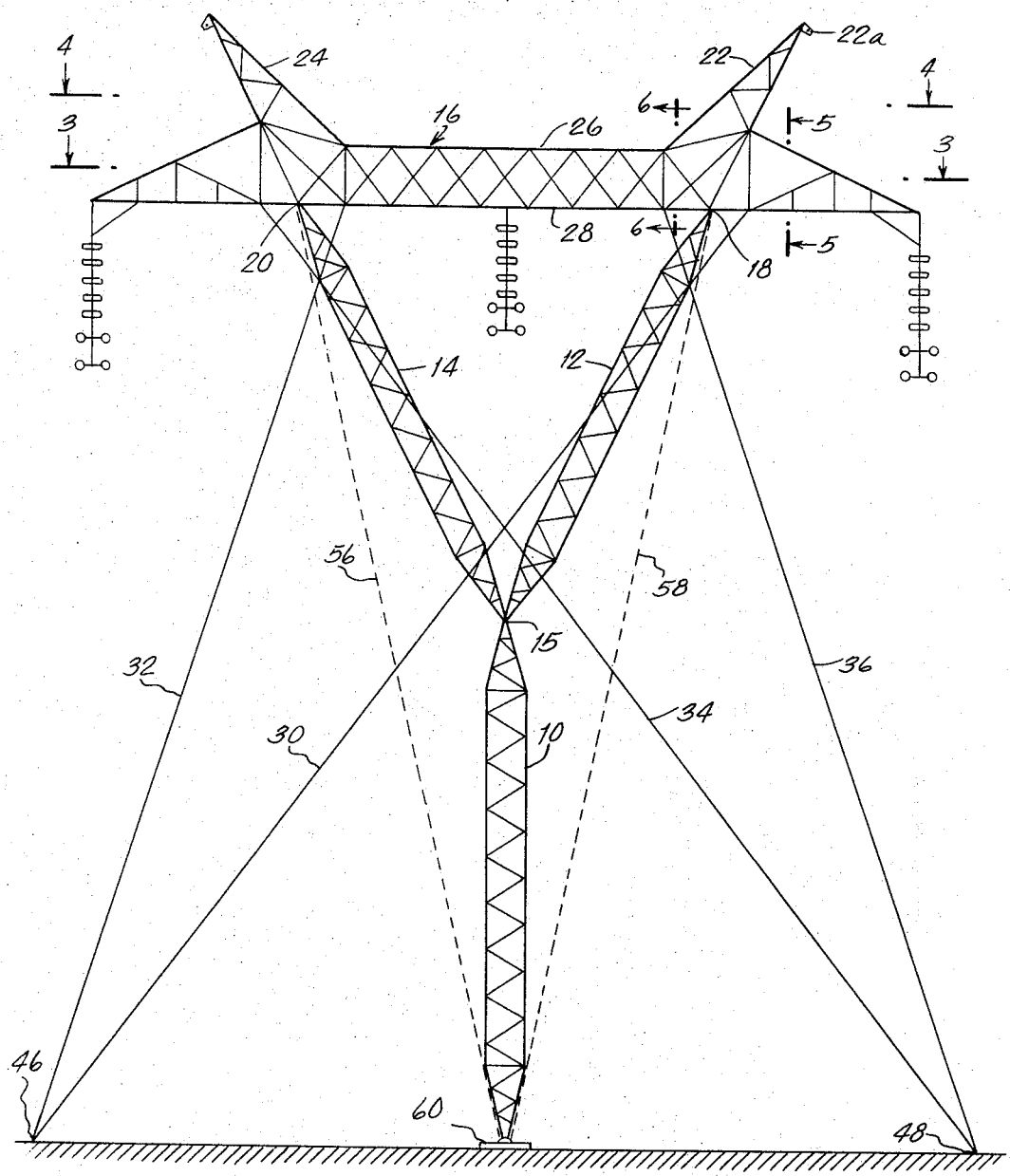
FIG. 1 is a front elevational view of a generally diagrammatic nature of a power line transmission tower of Y configuration which embodies the invention.

As shown in FIG. 1, the power transmission line tower herein provides a single vertical leg 10 and first and second upwardly extending and outwardly diverging arms 12 and 14 pivotally connected to the upper end of the vertical leg at a common point 15, thereby describing a cross-beam support of Y configuration.

A horizontal cross-beam 16 (entirely rigid as noted from the drawing) is normally articulated to the arms 12 and 14 of the Y by means of pins 17 (FIGS. 10 and 11) at points 18 and 20, respectively. However, a rigid joint may be used at these connections. These points are located at the inner end of a pair of truss structures 22 and 24, respectively. The truss structures provide eyes 22a and 24a (FIG. 7) for the reception of ground wires. The entirely rigid cross-beam 16 and arms 12 and 14 constitute a cross-beam assembly. The pivotal connection of arms to vertical leg constitutes the sole attachment of the cross-beam assembly to vertical leg and reduces bending moments which would develop in towers not so constructed.

The vertical leg 10, the upwardly and outwardly extending arms 12 and 14 and the cross-beam 16 are comprised of longitudinal corner elements which are fabricated into column-and-beam structures of suitable cross-section by conventional perpendicular and diagonal internal bracing as may be required by the size of the tower and the weight of the intended load, all in a manner well known by those skilled in the art.

Figure 1A:
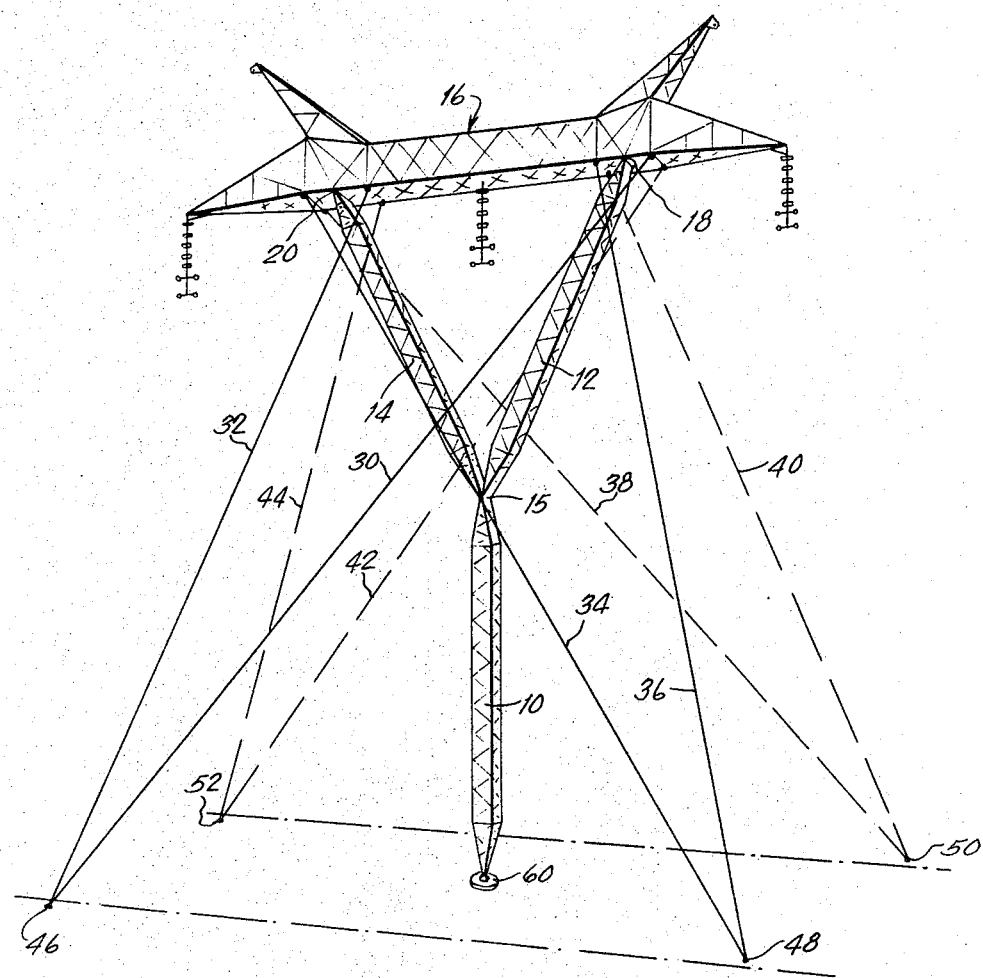
FIG. 1A is a perspective view of a transmission tower in which the invention is embodied, the guy wire system attached to the near face of the cross-beam being shown in solid lines, while the corresponding guy wire system attached to the far face of the cross-beam is shown in dot-and-dash lines.

The cross-beam 16 (FIGS. 2–6) provides a near face 16c and a far face 16d consisting of the vertical walls between an upper chord 26 and a lower chord 28. Two first and two second sets of guy wires are connected to the cross-beam. A first set of guy wires connected to the cross-beam 16 is shown in FIG. 1A as comprising a first wire 30 and a second wire 32, while a second set comprises a first wire 34 and a second wire 36. The guy wire sets may be connected to the cross-beam at any suitable points as, for example, along the center line of the cross-beam. In a presently preferred form of construction, the wires are attached at opposite faces of the cross-beams, as shown in FIG. 1A.

In FIG. 1A, the corresponding sets of guy wires descending from the far face of the cross-beam are shown in dot-and-dash lines. In these sets a first wire 38 and a second wire 40 comprise the first set of guys while a first wire 42 and a second wire 44 comprise the second set of guys. Sets of guy wires are connected to the cross-beam 16 in the vicinity of the connections 18 and 20 between the arms 12 and 14 and the cross-beam 16.

The first wires 30 and 42 from the first and second sets, respectively, at opposite sides of the tower are preferably connected to the cross-beam at points beyond (outwardly of) the connection 18 between the cross-beam 16 and the first arm 12 of the Y section of the tower. The second wires 32 and 44 of these same guy sets are preferably connected to the cross-beam 16 at points within the connection 20 of the cross-beam and the second arm 14 of the Y structure. The first wires 34 and 38 of the second and first guy sets, respectively, at opposite faces of the tower are preferably connected to the cross-beam 16 at points beyond (outwardly of) the connection 20 of the cross-beam and the second arm 14 of the Y structure, whereas the second wires 36 and 40, respectively, of these same pairs are preferably connected to the cross-beam 16 at points within the connection 18 of the cross-beam and the first arm 12 of the Y tower. This arrangement of guy wires provides two complete guying systems.

The guy wires are attached at their lower ends to suitable ground anchors. A separate anchor may be used for each wire, if necessary. However, it is advantageous, wherever possible, to use a common anchorage for pairs of wires, as shown in the drawings. In FIGS. 1A and 14, the first set of guy wires comprising wires 30 and 32 at the near side of the tower are brought down and out to a common ground anchorage 46, the second set of guys at the same side of the tower comprising the wires 34 and 36 are brought down and out to a common ground anchorage 48. The first set of guys at the opposite face of the tower comprising the wires 38 and 40 are brought down and out to a common ground anchorage 50 and the second set of guy wires at the far side of the tower comprising the wires 42 and 44 are brought down and out to a common anchorage 52.

The upper ends of the guy wires may be connected to the cross-beam 16 in any suitable manner. For example, these wires may be attached to the cross-beam by means of attaching eyes 16a and 16b of the character shown in FIGS. 8 and 9.

If the junction of the vertical leg 10 and the upwardly and outwardly diverging arms 12 and 14 were rigid, the tower, although somewhat flexible, could be lifted and set in place in one piece, the four outer guys anchored, plumbed, and two of the cross guys (from opposite ends of the cross-beam on the same side of the tower) anchored before stringing the middle transmission line conductor.

Certain combinations of load, under these conditions, would lead to the deflection of the junction relative to the ends, and secondary stress would arise which may be harmful. A pin 54 at the junction, as shown in FIG. 12, disposed on an axis parallel to the transmission line, may be used to articulate the arms of the Y to the upper end of the leg 10. This simplifies the assembly and eliminates all secondary moments for all loading conditions. However, with an articulated structure it is necessary, during erection, to use a pair of temporary guy wires 56 and 58, as shown in FIG. 1. These wires extend between the points 18 and 20 at which the cross beam is connected to the arms of the Y and the lower end of the leg 10. Two such temporary guys make the system sufficiently rigid to permit erection of the tower. After the tower has been erected and made self-supporting by guying, the temporary guys 56 and 58 may be removed. In lieu of using temporary guy wires solely for erection, it is quite possible to employ a pair of the permanent guy wires for this purpose on a temporary basis.

The vertical leg 10 of the tower may be supported at its lower end on a footing 60 which is provided with a spherical seat casting 62 (FIG. 13) adapted to cooperate with a base casting 64 at the base of the leg. A bolt 66 interconnecting the seat casting 62 and the base casting 64 provides a positive connection between the leg of the tower and the footing.

As shown in FIG. 14, the anchorages for the guy wire sets are arranged in non-rectangular relation in order to separate the crossed wires from opposite ends of the cross-beam on the same side of the tower, thus avoiding contact between the wires in the region of their crossing.

Figure 15:
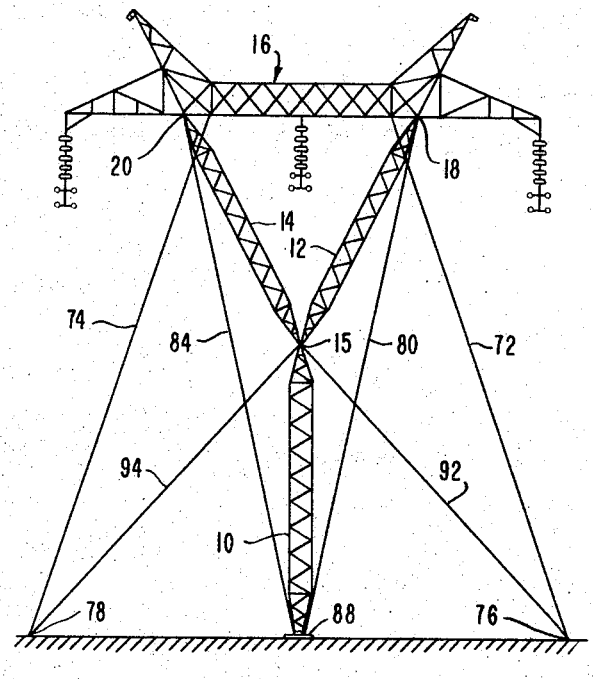
FIG. 15 is a front elevational view of a generally diagrammatic nature of a power line transmission tower of Y configuration as shown in FIG. 1 employing an alternative guy wire system.
Figure 16:
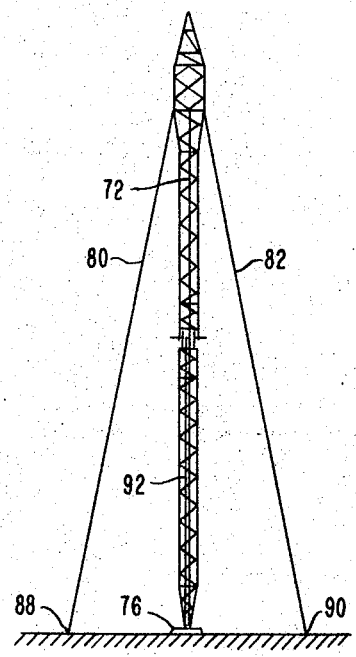
FIG. 16 is a side elevational view of the transmission tower of FIG. 15.
Figure 17:
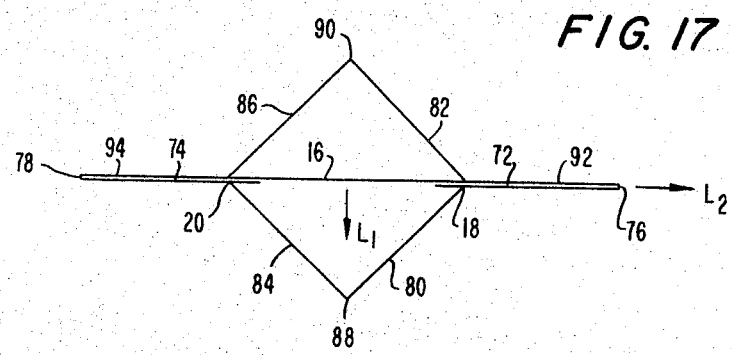
FIG. 17 is a top elevational view of the transmission tower of FIG. 15.

FIGS. 15–17 show an alternative guying arrangement for a transmission line tower of the type illustrated in FIG. 1. The same reference numerals designate like parts in these figures. In this arrangement, as in that of FIG. 1, eight guy wires are employed to support the tower. Guy wires 80 and 84, forming a first pair of guy wires, extend from positions on the cross-beam 16 respectively adjacent to the points 18 and 20 to a common ground anchorage 88. Guy wires 82 and 86, forming a second pair of guy wires, extend from positions respectively adjacent to the points 18 and 20 on the cross-beam 16 to a common ground anchorage 90. The first pair of guy wires 80 and 84 are thus positioned on one side of a plane defined by the Y-tower assembly, while the guy wires 82 and 86 of the second pair are on the other side of this plane. Guy wires 72 and 74, forming a third pair of guy wires, extend from positions respectively adjacent to points 18 and 20 on the cross-beam 16 to ground anchors 76 and 78, respectively. Guy wires 92 and 94, forming a fourth pair of guy wires, extend from the junction 15 of the vertical leg 10 and the upwardly and outwardly extending arms 12 and 14 of the Y-tower assembly to the ground anchors 76 and 78, respectively. It will be noted that the ground anchors 76 and 78 are substantially within the plane defined by the Y-tower assembly.

In FIGS. 15 and 17, the guy wires 80, 82 and 84, 86 are shown as being attached to the cross-beam 16 respectively at the points 18 and 20. The guy wires 72 and 74 are shown as being attached to the cross-beam at positions inwardly of these points. The exact points of attachment of these guy wires to the cross-beam are not crucial, and the guy wires may be fastened to the cross-beam wherever convenient. Further, although the arrangement as shown employs a single ground anchor for two guy wires, a separate ground anchor for each guy wire may be employed, if desired.

An advantage of the guying arangement in FIGS. 15–17 is that the stringing of the central transmission line conductor is simplified because there are no crossed guy wires as in the arrangements of FIGS. 1 and 1A. Further, the guying system of FIGS. 15–17 reduces a possible moment that may be developed under certain loading conditions. In particular, the guys 80, 82, 84 and 86 may be attached to positions more closely to the ends of the cross-beam 16 adjacent to the outer transmission line conductors than may be the guy wires 32, 36, 40 and 44 of the system of FIGS. 1 and 1A. This is because the guy wires 32, 36, 40 and 44 all extend from positions on the cross-beam 16 toward the outer transmission line conductors, while the guy wires 80, 82, 84 and 86 all extend from positions on the cross-beam away from the transmission line conductors. By attaching guy wires closer to the ends of the cross-beam 16, a bending moment in the cross-beam caused by an effective longitudinal force applied to the end of the cross-beam is substantially reduced.

Still further, the guying arrangement of FIGS. 15–17 is determinate for all loading conditions, whether longitudinal or lateral. Referring to FIG. 17, assume an effective longitudinal load $L_1$ acts as shown. In this case the two wires 82 and 86 resist the load, each guy wire sharing a part of the load as determined by the angle between the guy wires. No other guy wires share in the load—the guy wires 80 and 84 tend to go slack under this loading situation, while the guy wires 74, 94 and 72, 92 are at right angles to the effective load and cannot resist the load. In the case of a longitudinal load in the opposite direction, the guy wires 80 and 84 share the load.

In the case of a lateral load $L_2$, for example, the guy wires 74 and 94 together resist the load. The guy wire 74, for example, may not assume the entire load by itself, since the vertical component of the guy force creates a bending moment about the center of the cross-beam 16 (the point through which the reaction force in the vertical leg 10 acts) which must be counterbalanced. The counterbalancing moment is created by the vertical component of the force in the guy wire 94. Hence the guy wire 94 shares the load $L_2$ with the guy wire 74, and the horizontal components of the forces in the guy wires 74 and 94 together total the lateral load $L_2$. The fractional shares of the lateral load assumed by the guy wires 74 and 94 are determined by the angle between these guy wires.

For such a lateral load $L_2$ the guy wires 72 and 92 tend to go slack and take no part of the load. The guy wires 80, 82, 84 and 86 assume no part of the load inasmuch as the Y-tower could pivot about the base of the tower in the plane of the guy wires 72, 74, 92 and 94 without any resistance from the guy wires 80–86. Hence the system is determinate for the lateral load $L_2$. In the case of a lateral load in the opposite direction, the guy wires 72 and 92 share the load.

Since the guy wires 72, 92 and 74, 94 support only lateral loads, while the guy wires 80, 84 and 82, 86 support only longitudinal loads, the guy wires and their corresponding ground anchors 76, 78 and 88, 90 may be made of different capacities as determined by loading requirements in the field. For example, if lateral loads are much greater than longitudinal loads, the guy wires 80, 82, 84 and 86 and the anchors 88 and 90 may be relatively light, while the guy wires 72, 92, 74 and 94 and the anchors 76 and 78 may be relatively heavy. In the arrangement of FIGS. 1 and 1A, since all guys and anchors share in longitudinal and lateral loads, all guy wires and anchorages must be designed to carry the heaviest load.

The system of FIGS. 1 and 1A is determinate for lateral loads but is indeterminate for longitudinal loads. Referring to FIG. 14, assume a lateral load $L_2$ is applied as shown. Such a load is resisted by the guy wires 30, 32, 42 and 44 which together share the load. The guy wires 34, 36, 38 and 40 all tend to go slack. The entire load $L_2$ cannot be assumed by the guy wires 32 and 44, for example, inasmuch as the vertical components of the forces in these guy wires act no one side of the vertical leg 10 of the tower and create a bending moment about the center of the cross-beam 16 (the point through which the reaction force in the vertical leg 10 acts). A counterbalancing bending moment is created by the vertical components of the forces in guy wires 30 and 42. Hence these latter guy wires share the load $L_2$ with the guy wires 32 and 44, and the horizontal components of the forces in the guy wires 30, 42 and 32, 44 together total the lateral load $L_2$. The fractional shares of the total load $L_2$ assumed by these guy wires are determined by the angles between the guy wires 30 and 32 as well as 42 and 44.

For a lateral load in the opposite direction, the guy wires 34, 36, 38 and 40 all share the load.

For a longitudinal load such as $L_1$ in FIG. 14, the system is indeterminate since the guy wires 40 and 44 could together share the entire load, as could the guy wires 38 and 42. Note that the horizontal components of the forces in guy wires 40 and 44, for example, may total the load $L_1$. Inasmuch as such components act on opposite sides of the point through which the load $L_1$ acts on the cross-beam 16, they create bending moments about that point which tend to cancel each other. The vertical components of the forces in the guy wires 40 and 44 also act on both sides of that point, and hence create counterbalancing moments about the point. For these same reasons, the guy wires 38 and 42 could assume the total load $L_1$. Hence it cannot be accurately predicted how the guy wires will share a load, and the sharing may be dependent upon pretensioning of the guys in the field. An indeterminate load-sharing arrangement such as this is undesirable, inasmuch as each pair of guy wires 40, 44 and 38, 42 must be of a size sufficient to stand the maximum possible longitudinal load to the system and inasmuch as analysis of the loading situation is prevented.

For a longitudinal load in the opposite direction, the guy wires 30, 32, 34 and 36 assume the load in an indeterminate manner.

It should be noted that the indeterminacy of the guying arrangement in FIGS. 1 and 1A may be overcome and the entire system made determinate for longitudinal as well as lateral loads if the guy wires are not attached directly to the ground anchors as shown. In particular, the system may be made determinate if the guy wires 30 and 32 are attached to a single guy wire which is connected to the ground anchor 46. The remaining pairs of guy wires 34 and 36, 38 and 40, and 42 and 44 would be similarly connected by single guy wires to the ground anchors 48, 50 and 52, respectively. Each single guy wire connected to a ground anchor would force the two guy wires associated therewith to share the load in the single guy wire. Thus in the case of a longitudinal load $L_1$ as shown in FIG. 14, the guy wires 42 and 44 would be forced into sharing a part of the load transmitted to the ground anchor 52, and the guy wires 38 and 40 would be forced into sharing a part of the load transmitted to the ground anchor 50. The fractional shares of the load assumed by these guy wires would be determined by the angle between each of the guy wires 38, 40, 42 and 44 and the single guy wire connected to the ground anchor associated therewith. A disadvantage with such an arrangement is that forces in the single guy wires connected to the ground anchors tend to urge the Y-tower to be moved so that certain ones of the guy wires 30–44 line up with these single guy wires. For example, the Y-tower might be urged to move so as to cause the guy wire 42 to align itself with the single guy wire connected to the ground anchor 52. This would tend to throw the entire load onto a single one of the pairs of guy wires mentioned above, for example, the guy wires 38 and 42, and the movement of the tower might be excessive. Hence an arrangement such as shown in FIGS. 15–17 which is determinate for both longitudinal and lateral loading is deemed to be preferable over a modified arrangement as just described.

Figure 18:
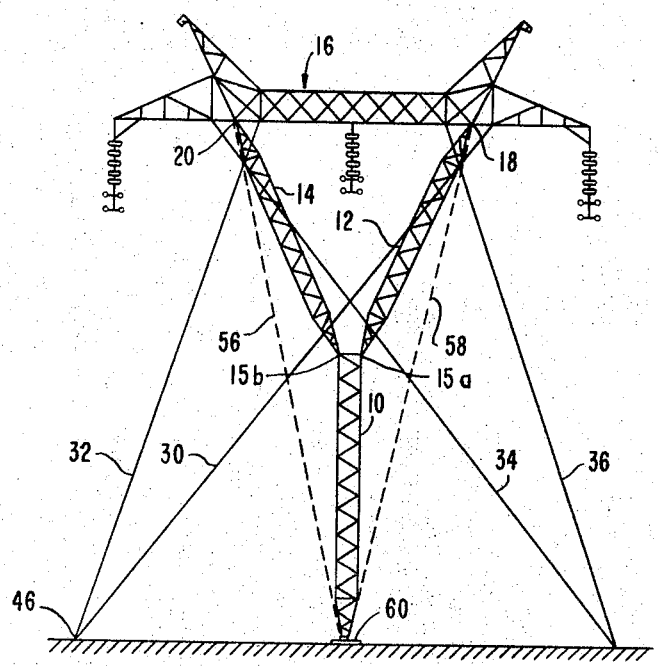
FIG. 18 is a front elevational view of a generally diagrammatic nature of a power line transmission tower of Y configuration similar to the tower shown in FIG. 1 and employing an alternative attachment of the upwardly extending arms of the tower to the vertical leg of the tower.

FIG. 18 shows a modified Y-tower arrangement similar to that shown in FIG. 1, except that the upwardly extending and outwardly diverging arms 12 and 14 of the tower are each separately pivotally attached to the vertical leg 10, as at 15a and 15b, respectively. The pivotal attachment of the arms to the vertical leg may be about axes which are perpendicular to the plane defined by the Y-tower. The pivotal attachment of each of the arms to the vertical leg may take the form of the attachment shown in FIG. 12, as described above, including a pin 54 which articulates the associated arm of the Y-tower to the upper end of the vertical leg. The advantages of such an arrangement are improved clearances for the center transmission line conductor (by virtue of the additional spreading apart of the arms 12 and 14 of the tower), a simplified arrangement for the vertical leg 10 by virtue of the symmetry of the two pins, and the creation of beneficial end moments at the center of the structure. While the tower has been shown as adapted to the guying system of FIGS. 1 and 1A, it is also suitable for other guying arrangements, such as that shown in FIGS. 15–17.

While the novel features of the invention have been illustrated and described in connection with specific embodiments of the invention, it is believed that these embodiments will enable others skilled in the art to apply the principles of the invention in forms departing from the exemplary embodiments herein. For example, although the articulation of the arms 12 and 14 to the vertical leg 10 has been indicated as being about an axis or axes perpendicular to the plane of the Y-tower, ball-joint construction might be employed to render the arms pivotable about the vertical leg in any direction to create in effect a V-tower on a high pedestal. Such a system, with appropriate guying, would be determinate for all loading cases. However, difficulties would be encountered in installing the tower, and the failure of one guy wire could cause the tower to collapse except as it is held up by the transmission line conductors.

As another example of a possible modification, an eight-guy Y-tower might be employed with four ground anchors as in FIG. 1A, for example, but with four guy wires attached to the cross-beam 16 (for example, the guy wires 32, 36, 40 and 44) and with the remaining guy wires attached to the junction 15 of the arms 12 and 14 and the vertical leg 10 (the guy wires 30, 34, 38 and 42). Such a system would utilize the tower material to the maximum advantage under transverse loading, the unsupported length of the arms would be a minimum for all directions of wind load, and the guy wires would provide no obstruction to the stringing of the central transmission line conductor. In the case of a break in one or more of the transmission line conductors, however, only a single set of guy wires would be brought into effect, and the maximum guy load would be equal to that in a four-guy V-tower with a resulting increase in anchorage loads.

As still another example of a modification, a six-guy Y-tower system might be employed using four guy wires such as the guy wires 32, 36, 40 and 44 of FIG. 1A attached as shown to the cross-beam 16, and with the remaining two guy wires attached to the cross-beam respectively adjacent to the points 18 and 20 and extending to the base 60 of the tower. Such an arrangement, when the tower is pivotable at the junction of the arms of the Y and the vertical leg of the Y, is statically determinate, with no secondary moments for any loading condition and with the system behaving as a four-guy V-tower. The unsupported arm length under transverse loads would be reduced, but there would be created in the vertical leg, in addition to the axial load from the main guy wires, load from the two guy wires to the base of the tower which would more than double the compression load in the leg.

As a still further change, the guy wires need not be attached to the cross-beam as shown in FIG. 1A, for example, but might be attached to the arms 12 and 14. And the cross-beam need not be made as shown in the drawings, but might involve a V-shaped structure, for example.

These examples are merely illustrative of many changes that might be made in the exemplary embodiments set forth. Accordingly, the invention should be taken to be defined by the following claims.

What is claimed is:

1. A transmission line tower requiring guying for proper support above ground and resistance to loads, comprising a vertical leg and first and second upwardly extending and outwardly diverging arms connected to said vertical leg thereby describing a cross-beam support of substantially planar Y configuration, a cross-beam bridging said arms to form with the arms and the vertical leg a Y-tower assembly, eight guy wires connected to said Y-tower assembly, means for anchoring said guy wires to the ground at positions about said Y-tower assembly for supporting said Y-tower assembly above the ground and resisting lateral and longitudinal loads, four of said guy wires are connected to said Y-tower assembly and are anchored to the ground on one side of a plane defined by said Y-tower assembly, and the remaining four guy wires are connected to said Y-tower assembly and are anchored to the ground on the other side of said plane, said anchoring means comprises two ground anchors on each side of the plane defined by said Y-tower assembly, each ground anchor supporting two guy wires, one of said two guy wires being connected to said Y-tower assembly adjacent to said outer end of one of said arms and the other of said two guy wires being connected to said Y-tower assembly adjacent to said outer end of the other of said arms, one guy wire supported by each ground anchor is connected to the cross-beam at a position inside of the connection of one of the arms to the cross-beam and the other guy wire supported by each ground anchor is connected to the cross-beam at a position outside of the connection of the other arm to the cross-beam, the two ground anchors on each side of the plane defined by said Y-tower assembly are on opposite sides of and equidistantly spaced from a line along the ground which is substantially perpendicular to said plane and passes through said vertical leg, the two ground anchors on each side of the plane defined by said Y-tower assembly are spaced different distances from said plane, two of said ground anchors on opposite sides of said plane being positioned opposite different ends of said cross-beam and each being spaced a first distance from said plane, the remaining two of said ground anchors on opposite sides of said plane being positioned opposite different ends of said cross-beam and each being spaced a second distance from said plane, and said first and second arms are pivotally attached to said vertical leg about a horizontal axis perpendicular to the plane of said Y-tower assembly.

2. A transmission line tower as recited in claim 1, wherein said first and second arms are pivotally attached to the vertical leg about separate horizontal axes perpendicular to the plane of said Y-tower assembly and spaced equidistantly from the ground.

3. A transmission line tower as recited in claim 1, wherein said vertical leg includes a spherical base casting at its lower end, a footing on the ground, said footing including a spherical seat casting cooperating with said spherical base casting, and a bolt interconnecting said seat casting and said base casting.

4. A transmission line tower as recited in claim 2, wherein said vertical leg includes a spherical base casting at its lower end, a footing on the ground, said footing including a spherical seat casting cooperating with said spherical base casting, and a bolt interconnecting said seat casting and said base casting.

5. A transmission line tower requiring guying for proper support above ground and resistance to loads, comprising a vertical leg and first and second upwardly extending and outwardly diverging arms connected to said vertical leg thereby describing a cross-beam support of substantially planar Y configuration, a cross-beam bridging said arms to form with the arms and the vertical leg a Y-tower assembly, eight guy wires connected to said Y-tower assembly, means for anchoring said guy wires to the ground at positions about said Y-tower assembly for supporting said Y-tower assembly above the ground and resisting lateral and longitudinal loads, two of said guy wires are connected to said Y-tower assembly adjacent to the junction of said vertical leg and said arms, said two guy wires connected to said Y-tower assembly adjacent to the junction of said vertical leg and said arms are anchored to the ground substantially in the plane defined by said Y-tower assembly, two other guy wires connected to said Y-tower assembly are anchored to the ground substantially in said plane, and, of the remaining four guy wires attached to said Y-tower assembly, two of said guy wires are anchored to the ground on one side of said plane and the remaining two guy wires are anchored to the ground on the other side of said plane, two guy wires forming a first pair are attached to spaced points adjacent opposite ends of the cross-beam and are anchored to the ground on one side of a plane defined by the Y-tower assembly, two guy wires forming a second pair are attached to spaced points adjacent opposite ends of the crossbeam and are anchored to the ground on the opposite side of said plane, two guy wires forming a third pair are attached to spaced points adjacent opposite ends of the cross-beam and are anchored to the ground at opposite sides of the vertical leg substantially in said plane, two guy wires forming a fourth pair are attached to the junction of the vertical leg and said arms and are anchored to the ground at opposite sides of the vertical leg substantially in said plane, the two guy wires of the first pair of guy wires are connected to a first common ground anchor on one side of said plane substantially on a line perpendicular to the plane and passing through said vertical leg, the two guy wires of the second pair of guy wires are connected to a second common ground anchor on the other side of said plane substantially on said line, the two guy wires of the third and fourth pairs of guy wires that are adjacent to one end of the cross-beam are connected to a third common ground anchor on one side of the vertical leg substantially in said plane, the two guy wires of the third and fourth pairs of guy wires that are adjacent to the opposite end of the cross-beam are connected to a fourth common ground anchor on the opposite side of the vertical leg substantially in said plane, said first and second ground anchors are equidistantly spaced from said vertical leg and said third and fourth ground anchors are equidistantly spaced from said vertical leg, and said first and second arms are pivotally attached to said vertical leg about a horizontal axis perpendicular to the plane of said Y-tower assembly.

6. A transmission line tower as recited in claim 5, wherein said vertical leg includes a spherical base casting at its lower end, a footing on the ground, said footing including a spherical seat casting cooperating with said spherical base casting, and a bolt interconnecting said seat casting and said base casting.

7. A transmission line power requiring guying for proper support above ground and resistance to loads, comprising a vertical leg and first and second upwardly extending and outwardly diverging arms pivotally connected to the vertical leg, an entirely rigid cross-beam member bridging said arms to form with the arms a cross-beam assembly, said pivotal connection of said arms to said vertical leg constituting the sole attachment of the cross-beam assembly to said vertical leg, said vertical leg and cross-beam assembly comprising a Y-tower assembly, a plurality of guy wires connected to said Y-tower assembly, and means for anchoring said guy wires to the ground at positions about said Y-tower assembly for supporting said Y-tower assembly above the ground and resisting lateral and longitudinal loads.

8. A transmission line tower as recited in claim 7, wherein said cross-beam is pivotally connected to each of said arms.

9. A transmission line tower as recited in claim 7, wherein said first and second upwardly extending and outwardly diverging arms are pivotally connected to the vertical leg about an axis which is substantially perpendicular to the plane defined by said vertical leg and said arms.

10. A transmission line tower as recited in claim 7, wherein said first and second upwardly extending and outwardly diverging arms are each separately pivotally connected to the vertical leg.

11. A transmission line tower as recited in claim 7, wherein some of said guy wires are connected to said Y-tower assembly and are anchored to the ground on one side of a plane defined by said Y-tower assembly, others of said guy wires are connected to said Y-tower assembly and are anchored to the ground on the other side of said plane, said anchoring means comprising two ground anchors disposed on each side of said plane defined by the Y-tower assembly, said anchors on each side of said plane being disposed on opposite sides of a line along the ground parallel to said plane.

12. A transmission line tower as recited in claim 7, wherein said plurality of guy wires comprise four guy wires connected to said Y-tower assembly and anchored to the ground on one side of a plane defined by said Y-tower assembly, four other guy wires connected to said Y-tower assembly and anchored to the ground on the other side of said plane, and wherein, for each set of four guy wires, two of said guy wires are attached to said cross-beam on opposite sides of the connection of the first arm to the cross-beam and the remaining two guy wires of the set are attached to the cross-beam on opposite sides of the connection of the second arm to the cross-beam.

13. A transmission line tower as recited in claim 7, wherein two of said plurality of guy wires are connected to said Y-tower assembly adjacent to the junction of said vertical leg and said arms.

14. A transmission line tower as recited in claim 7, wherein said plurality of guy wires include eight guy wires as follows: two guy wires forming a first pair are attached to spaced points adjacent opposite ends of the cross-beam and are anchored to the ground on one side of a plane defined by the Y-tower assembly, two guy wires forming a second pair are attached to spaced points adjacent opposite ends of the cross-beam and are anchored to the ground on the opposite side of said plane, two guy wires forming a third pair are attached to spaced points adjacent opposite ends of the cross-beam and are anchored to the ground at opposite sides of the vertical leg substantially in said plane, and two guy wires forming a fourth pair are attached to the junction of the vertical leg and said arms and are anchored to the ground at opposite sides of the vertical leg substantially in said plane.

15. A transmission line tower as recited in claim 7, wherein said vertical leg includes a spherical base casting at its lower end, a footing on the ground, said footing including a spherical seat casting supporting said spherical base casting.

16. A transmission line tower as recited in claim 10, wherein said arms are connected to the vertical leg about separate horizontal axes substantially perpendicular to the plane defined by said Y-tower assembly and spaced equidistantly from the ground, and said cross-beam is pivotally connected to each of said arms.

17. A transmission line tower as recited in claim 12, wherein said anchoring means comprises two ground anchors on each side of the plane defined by said Y-tower assembly, each ground anchor supporting two guy wires, one of said two guy wires being attached to said cross-beam on the outside of the connection of one of the arms to the cross-beam and the other of said two guy wires being attached to the cross-beam on the inside of the connection of the other arm to the cross-beam.

18. A transmission line tower as recited in claim 17, wherein the two ground anchors on each side of the plane defined by said Y-tower assembly are on opposite sides of and equidistantly spaced from a line along the ground which is substantially perpendicular to said plane and passes through said vertical leg, the two ground anchors on each side of the plane defined by said Y-tower assembly are spaced different distances from said plane, two of said ground anchors on opposite sides of said plane being positioned opposite different ends of said cross-beam and each being spaced a first distance from said plane, the remaining two of said ground anchors on opposite sides of said plane being positioned opposite different ends of said cross-beam and each being spaced a second distance from said plane.

19. A transmission line tower as recited in claim 13, wherein said plurality of guy wires include other guy wires attached to said cross-beam.

20. A transmission line tower as recited in claim 19, wherein said two guy wires connected to said Y-tower assembly adjacent to the junction of said vertical leg and said arms are anchored to the ground substantially in the plane defined by said Y-tower assembly, said other guy wires comprising two guy wires anchored to the ground substantially in said plane and further guy wires anchored to the ground on opposite sides of the plane defined by said Y-tower assembly.

21. A transmission line tower as recited in claim 14, wherein the two guy wires of the first pair of guy wires are connected to a first common ground anchor on one side of said plane substantially on a line perpendicular to the plane and passing through said vertical leg, the two guy wires of the second pair of guy wires are connected to a second common ground anchor on the other side of said plane substantially on said line, the two guy wires of the third and fourth pairs of guy wires that are adjacent to one end of the cross-beam are connected to a third common ground anchor on one side of the vertical leg substantially in said plane, and the two guy wires of the third and fourth pairs of guy wires that are adjacent to the opposite end of the cross-beam are connected to a fourth common ground anchor on the opposite side of the vertical leg substantially in said plane.

22. A transmission line tower as recited in claim 21, wherein said first and second ground anchors are equidistantly spaced from said vertical leg and said third and fourth ground anchors are equidistantly spaced from said vertical leg.

References Cited
UNITED STATES PATENTS

| | | | |
|---|---|---|---|
| 1,741,963 | 12/1929 | Thomas | 52—40 |
| 2,116,368 | 5/1938 | Staubitz | 52—148 X |
| 2,300,351 | 10/1942 | Daugherty et al. | 52—649 |

(Other references on following page)

FOREIGN PATENTS

| | | |
|---|---|---|
| 491,527 | 6/1919 | France. |
| 723,736 | 4/1932 | France. |
| 427,137 | 3/1923 | Germany. |
| 668,408 | 3/1952 | Great Britain. |
| 1,116,601 | 5/1956 | France. |

OTHER REFERENCES

Electric World; May 12, 1962, "Guyed Y-Tower Easily Erected," pp. 80 and 81, copy in Group 350.

Electric World; Jan. 12, 1962, "Finland Builds Guyed Towers into EHV Transmission Lines," pp. 46–48, copy in Group 350.

Electric World; Feb. 18, 1963, "Ontario Hydro Buys 200 Alcon Guyed Towers," p. 34, copy in Group 350.

Electric World; July 15, 1963, "New 'Y'-Tower Placed by 'Copter' in Minutes," p. 79, copy in Group 350.

Electric World; Aug. 24, 1964, "Guyed Y-Towers for 500-Kv. Canadian Lines," pp. 52 and 53, copy in Group 350.

FRANK L. ABBOTT, *Primary Examiner.*

RICHARD W. COOKE, Jr., *Examiner.*

R. S. VERMUT, *Assistant Examiner.*